United States Patent [19]
McCafferty

[11] 3,912,344
[45] Oct. 14, 1975

[54] THRUST BEARING ASSEMBLY
[75] Inventor: James E. McCafferty, Springfield, Pa.
[73] Assignee: Kingsbury, Inc., Philadelphia, Pa.
[22] Filed: Feb. 19, 1974
[21] Appl. No.: 443,637

[52] U.S. Cl. ................................................ 308/160
[51] Int. Cl.² ........................................... F16C 17/06
[58] Field of Search .................... 308/160, 168, 172

[56] References Cited
UNITED STATES PATENTS

| | | | |
|---|---|---|---|
| 2,102,534 | 12/1937 | Howarth | 308/160 |
| 3,410,617 | 11/1968 | Schaefer | 308/160 |
| 3,550,973 | 12/1970 | Kitano et al. | 308/160 |
| 3,655,250 | 4/1972 | Sprenger | 308/160 |
| 3,817,586 | 6/1974 | Elwell | 308/160 |

*Primary Examiner*—M. Henson Wood, Jr.
*Assistant Examiner*—Michael Mar
*Attorney, Agent, or Firm*—Cameron, Kerkam, Sutton, Stowell & Stowell

[57] ABSTRACT

A thrust shoe bearing construction wherein each shoe may be off-set for both left-hand and right-hand rotation. Each shoe is capable of rocking about a support to thereby form a wedge-shaped lubricant film. The thrust shoes are moved clockwise or counterclockwise relative to their supports to accomodate right or left rotation.

11 Claims, 17 Drawing Figures

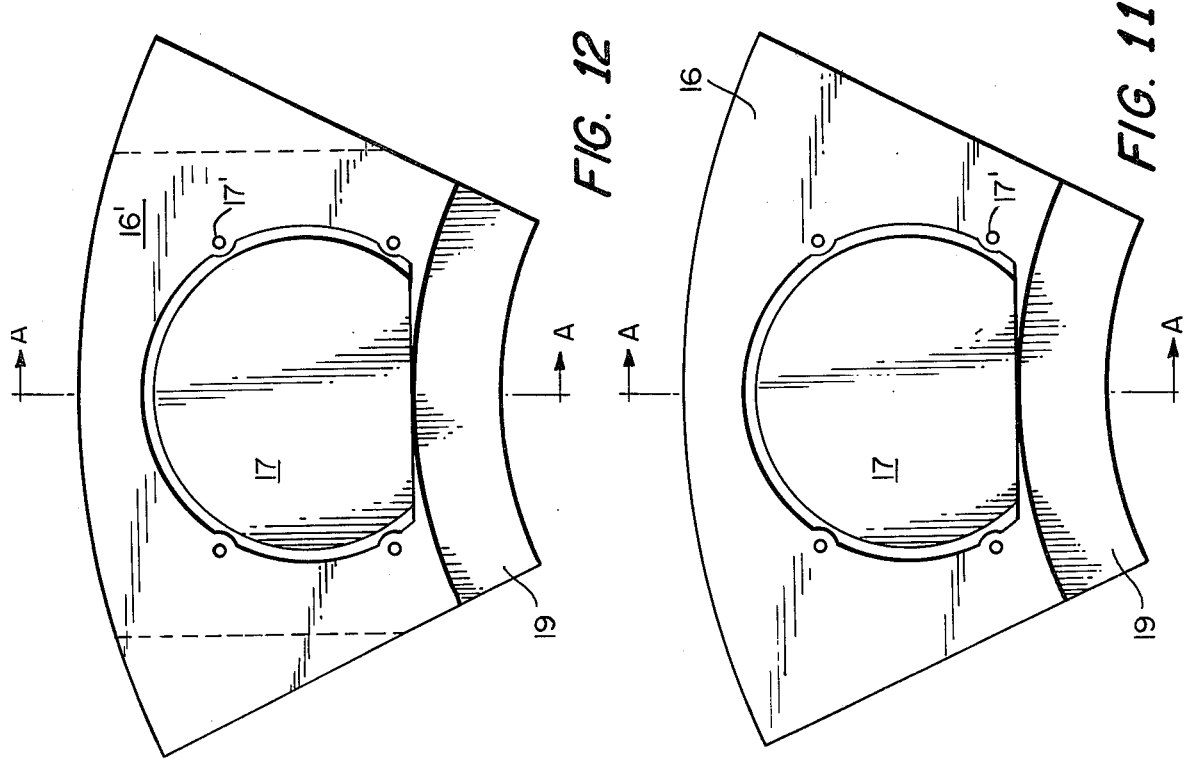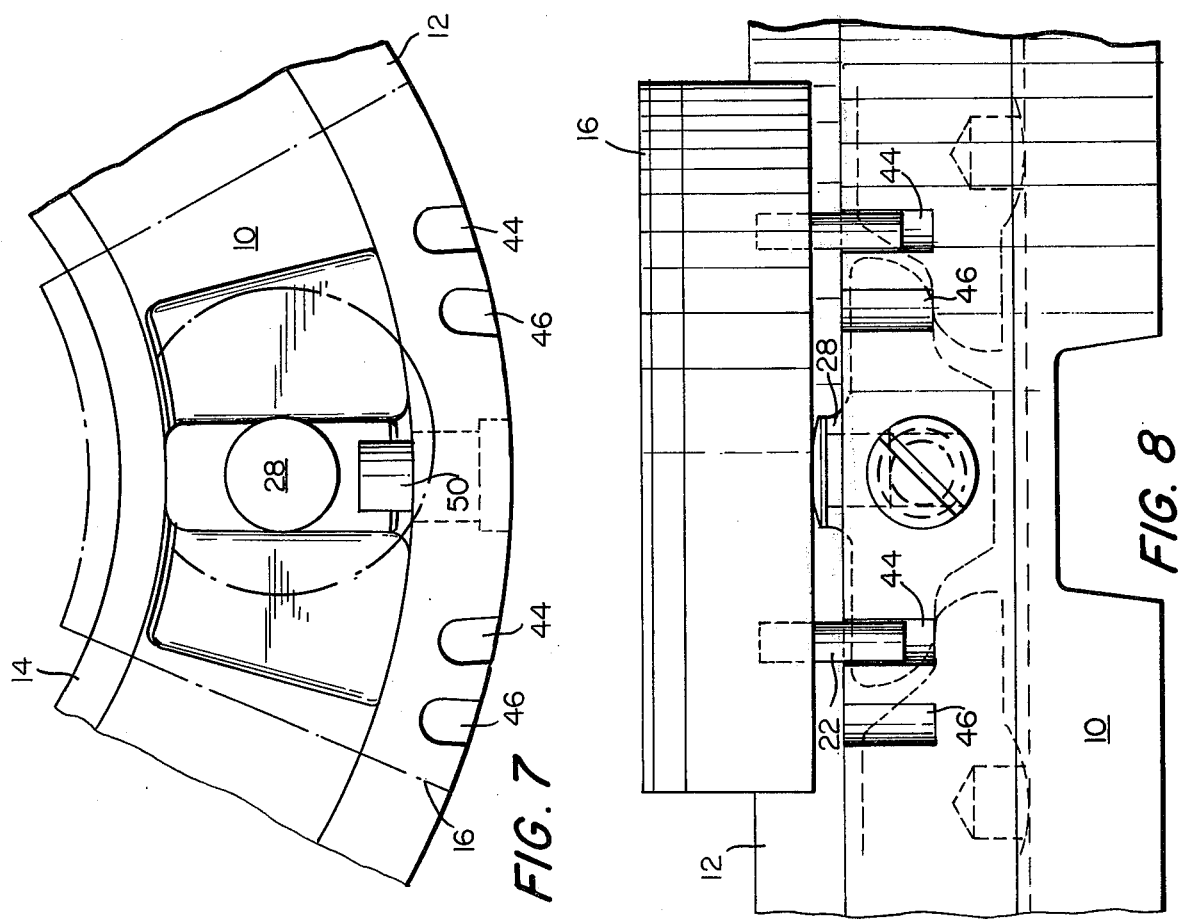

THRUST BEARING ASSEMBLY

This invention relates to thrust bearings of the type wherein a plurality of thrust bearing shoes are angularly spaced about a supporting base. Thrust bearings of this arrangement are known for supporting axially directed loads. Such loads or forces may arise, for example, whenever the end of a rotating member is axially supported. Due to the weight of such members, support of the shaft itself is not sufficient to carry the required load and recourse is then had to angularly arranged bearing or shoe elements which are positioned radially outwardly of the spindle or axle which carries the rotating member. Examples of such bearings may be seen by reference to U.S. Pat. Nos. 1,754,324 to Kingsbury, 1,390,191 to Howarth and 2,779,637 to Schaefer.

In bearings of this type, it is already known that bearing performance may be improved if the pivot or rocking point of each thrust shoe is offset from the center of the shoe a specific amount in the direction of rotation of the member being supported. A thin wedge-shaped fluid film of lubricating oil is formed in the area between the thrust bearing collar or runner (carried by the rotatable member being axially supported) and the thrust shoes. According to known practice, this offset is achieved by casting with or forming with each thrust shoe an abutment or rocking element which is displaced from the shoe center. This gives rise to shoes, for each axial end face, adapted for right-hand rotation as well as a (second) set of shows adapted for left-hand rotation. It is sometimes desirable, however, to change the direction of rotation of the element being supported and this has, in the past, occasioned the necessity for a second set of thrust shoes. Thus, if a rotatable element is rotated in one direction, then a set of, say, right-hand thrust shoes is required. If the rotation direction is changed, a second set of thrust shoes, namely left-hand thrust shoes, is required.

According to the practice of the present invention, only a single set of thrust shoes is required. This is accomplished in the following manner. Each thrust shoe or thrust bearing is, as in the prior art, arcuate in shape so as to define the angular contour of the rotatable elements being supported. But in distinction to the prior art, the rockable support for each thrust shoe is carried by the base ring or other lower structure instead of by the thrust shoe itself. Thus, the bottom of each thrust shoe is substantially planar. In order to change from a left to a right-hand rotation the thrust shoes are moved angularly so as to be offset in the required sense. By virtue of this arrangement only a single set of thrust bearing shoes is required for both right and left-hand modes of rotation.

IN THE DRAWINGS

FIGS. 7 and 8 are similar to FIGS. 1 and 2 and illustrate a fourth embodiment of the invention.

FIGS. 9a to 9e, inclusive, illustrate several embodiments of the abutment upon which each thrust shoe rests and about which it rocks to provide the required bearing film.

Figure 2:
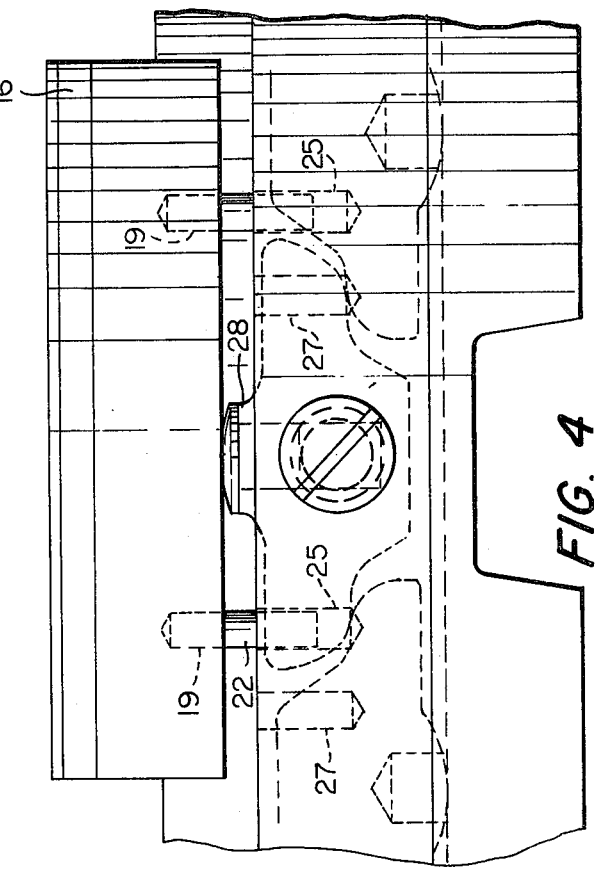
Figure 10:
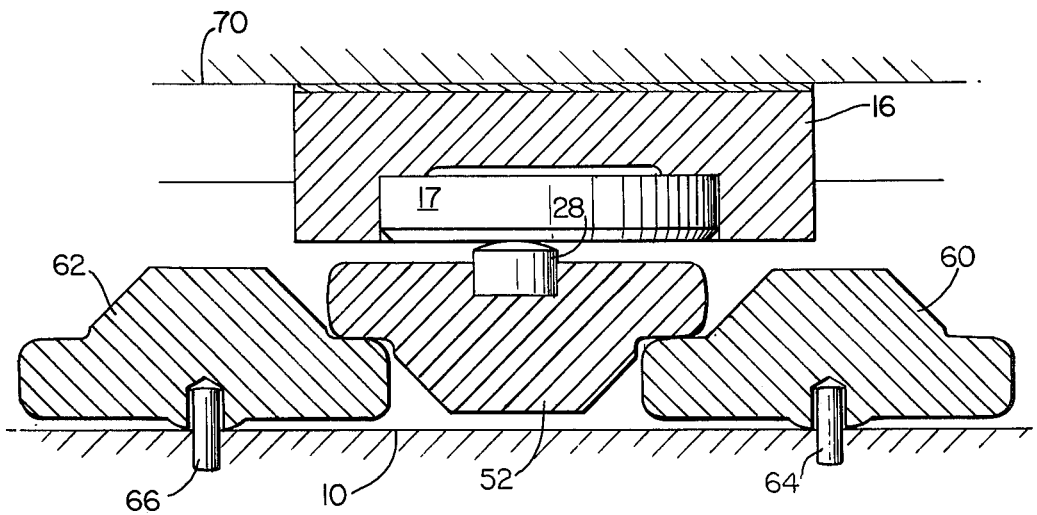

FIG. 10 is a partial elevational view, similar to FIG. 2, and shows a typical leveling plate assembly of the type indicated by dashed lines at FIG. 2.

FIGS. 11 and 12 illustrate typical thrust shoe configurations.

Figure 13:
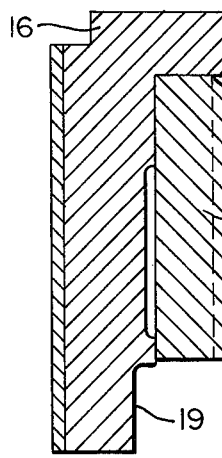

FIG. 13 is a view taken along section A—A of both FIGS. 11 and 12.

Figure 1:
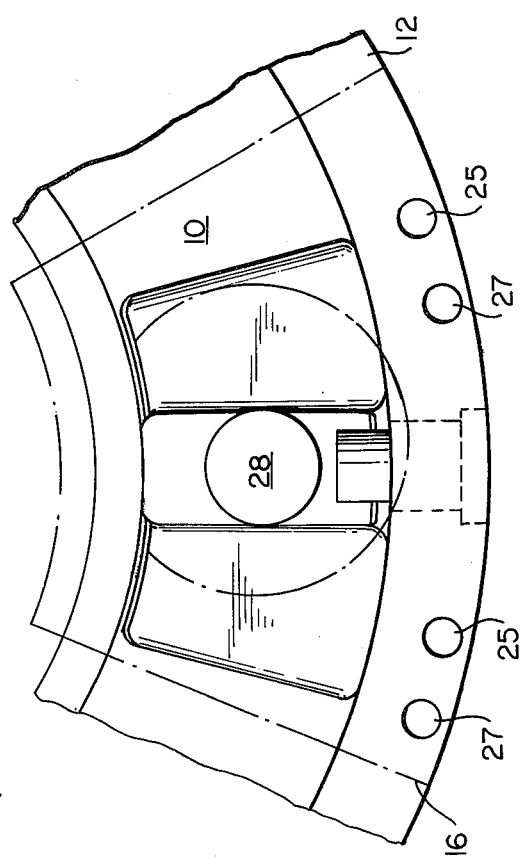
FIGS. 1 and 2 are partial plan and elevational views, respectively, of one embodiment of the invention.

Referring now to FIGS. 1 and 2 of the drawings, the numeral 10 denotes a circular supporting base for the thrust bearing assembly. The base is in the general form of an annulus rectangular in transverse cross-section. Outer and inner rims 12 and 14, respectively, may be integrally formed on the base ring 10. A thrust shoe denoted generally by the numeral 16 is supported on the annulus base ring by virtue of a plurality of leveling plates. The leveling plates are shown in greater detail in FIG. 10 and will be described later. The central leveling plate of each thrust shoe assembly carries an upstanding boss 28 which may be rounded as indicated. The leveling plates are shown in phantom or dashed lines in FIG. 2, and the central leveling plate is shown solid on the plan view of FIG. 1. The thrust shoe 16 is provided with a first pair of axially extending holes 18 on its under surface and with a second pair of axially extending holes 20 which also open onto the under surface of the shoe. Another pair of axially extending holes is denoted by the numeral 23, with this last pair being suitably formed such as by drilling on rim 12. A hardened metal insert, indicated by the dashed circle of FIG. 1 surrounding the rocking element 28, is placed on the underside of the shoe 16. This construction will be later described in greater detail. As seen by reference to FIG. 1, in the indicated angular position of the shoe 16 relative to the base ring 10, the hardened insert and hence the entire shoe 16 is off-center of its support point 28. Dowel pins 22 extend from the set of apertures 18 down into the set of apertures 23 to thereby position the thrust shoe in the indicated angular position on the base ring. When it is desired to reverse the direction of rotation of the element supported by the thrust shoes 16, it is only necessary to change the thrust shoes from the indicated angular position so that the dowel elements 22 now extend into the second aperture set 20. The reader may now readily visualize that such displacement will move the shoe 16 to the left as viewed in both FIGS. 1 and 2. This will cause the contact between the hardened insert on the bottom of the thrust shoe 16 to move to the left relative to fixed support point 28.

Thus, in the indicated position of FIG. 1, the thrust shoe is offset with respect to its supporting member 28 in one direction with dowels 22 in apertures 18. It will also be offset, but in the other direction, when the dowels 22 are positioned in apertures 20. The reader will now be in a position to visualize that a single set of thrust bearings 16 will be required for off-set operation no matter what their direction of rotation. It is only necessary to remove the shoes from the indicated position and reset them in the other set of apertures.

Figure 3:
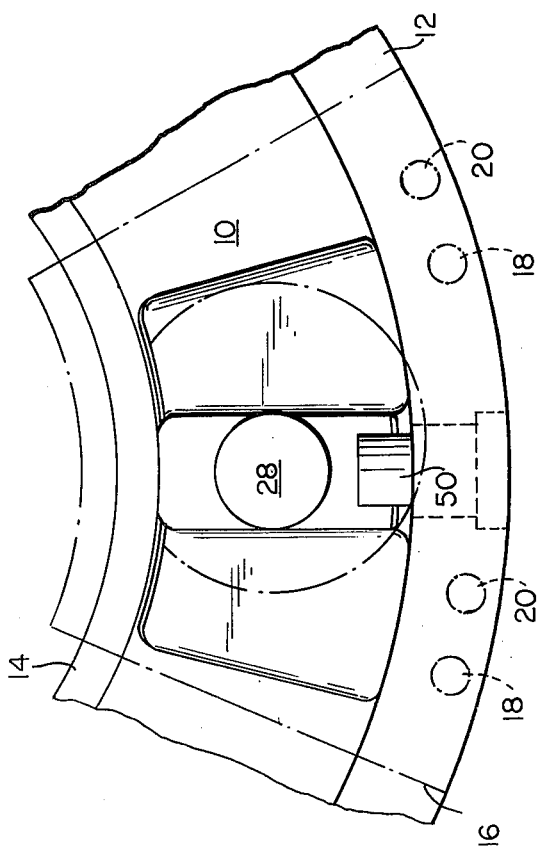
FIGS. 3 and 4 are similar to FIGS. 1 and 2, and illustrate a second embodiment.
Figure 4:
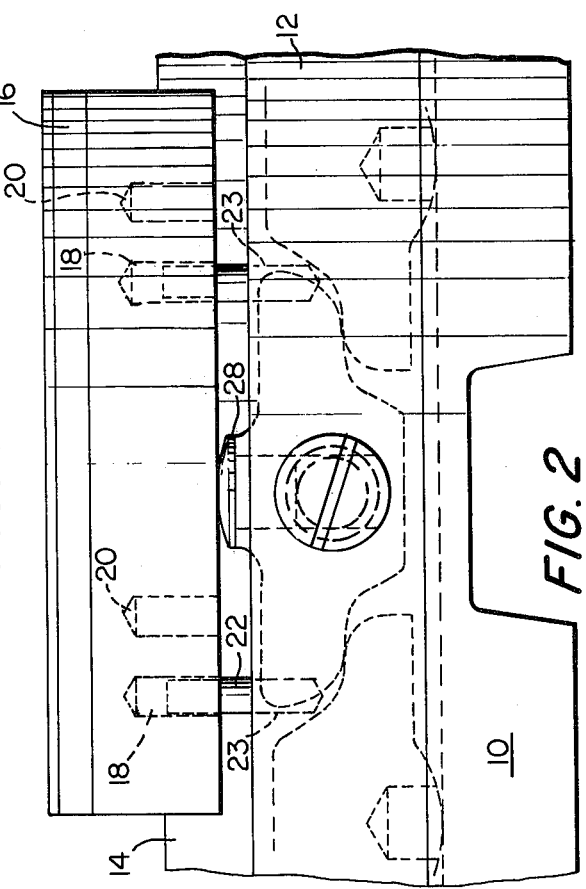

Referring now to FIGS. 3 and 4 of the drawings, a second embodiment is illustrated and is similar in all respects to the first-described embodiment, with the exception that a single pair of axially extending apertures is provided on the under surface of the thrust shoe, while two pairs of corresponding apertures are positioned on the base ring. As illustrated most clearly at FIG. 4, a pair of apertures 19 on the under surface of thrust shoe 16 receives a corresponding pair of dowel elements 22, the latter extending into a complementary first pair of apertures 25. The apertures 25, as illustrated at FIG. 3, are positioned on rim 12 and extend from the top surface thereof downwardly. The numeral 27 denotes a second set of apertures angularly displaced from the first set 25. The dashed circle surrounding the point 28 at FIG. 3 indicates a hardened metal insert on the bottom of shoe 16 and again an off-set is plainly visible for one direction of rotation. In order to change the position of the shoes to accommodate an opposite direction of rotation of the member supported by the thrust shoe 16, it is only necessary to remove the thrust shoes from the indicated configuration of FIG. 4 and place the shoe so that the dowels 22 now fit into the pair of apertures 27. The reader will readily visualize that this will cause the thrust shoe 16 to move to the left in both FIGS. 3 and 4, to thereby accommodate opposite sense of rotation in an off-center mode of thrust shoe support.

Figure 5:
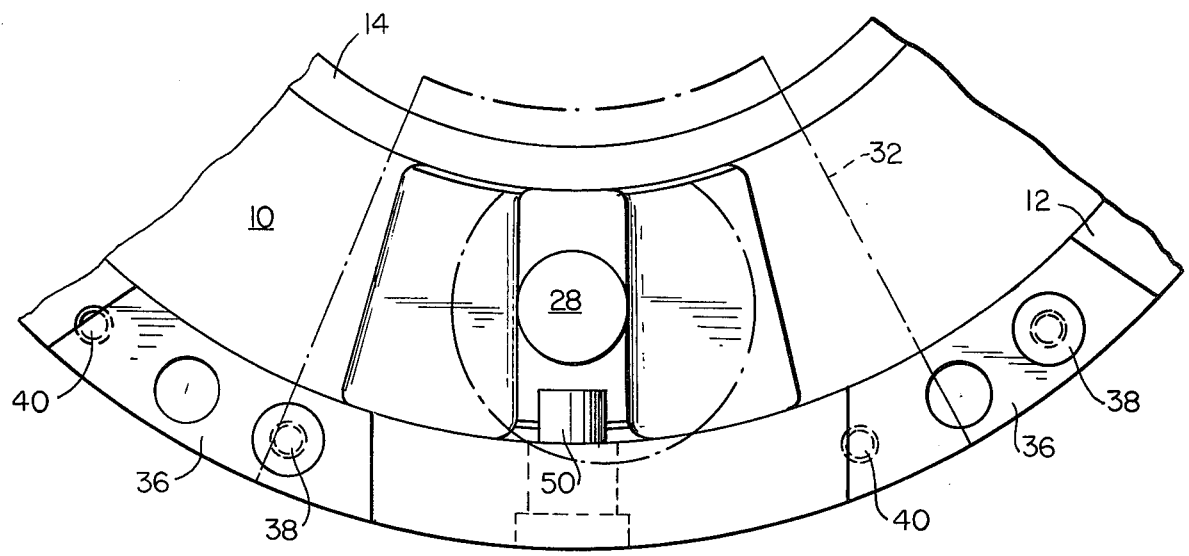
FIGS. 5 and 6 are similar to FIGS. 1 and 2, and illustrate a third embodiment of the invention.
Figure 6:
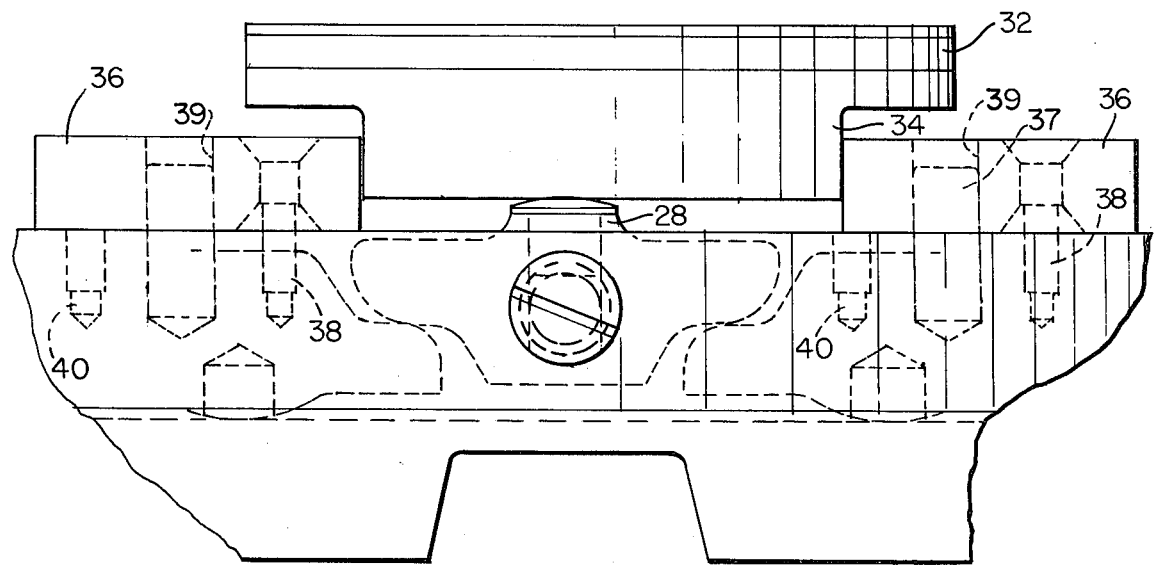

Referring now to FIGS. 5 and 6, a third embodiment is illustrated. Here, the dowel pins positioned in different axially extending apertures are replaced by blocks positioned on the outer rim 12 of base ring 10. Also, the configuration of the thrust shoe is slightly different. Referring now to these drawings, the numeral 32 denotes one of a plurality of angularly disposed thrust shoes positioned about base ring 10. Each shoe includes integral portion 34 which extends between and is sandwiched by a pair of blocks 36. The blocks 36 are of the same radial extent as the rim 12 and have an angular extent as indicated. There is a slight clearance between the edges of depending portion 34 and the blocks 36, to allow each shoe 32 to rock slightly about support 28 and form a wedge-shaped film of lubricating fluid between the top surface of shoes 32 and the rotatable member being supported. The off-set is illustrated at FIG. 5 wherein again the dashed circle surrounding the support 28 is shown off-set with respect to the support 28. Threaded elements extend from the blocks 36 and into a first set of apertures 38 on rim 12 of base ring 10. Locating dowels 37 extend upwardly from the rim 12, each dowel extending into an aperture 39 in block 36. In order to obtain off-set mode for the opposite direction of rotation, it is only necessary to invert each block or stop lug 36 over its respective locating dowel, with the threaded stud elements now extending into the second set of apertures 40 in the base ring.

Referring now to FIGS. 7 and 8 of the drawings, still another embodiment is illustrated. Here the shoes 16 are configured as indicated in the embodiments of FIGS. 1 and 3 and include a first set of apertures for receiving dowel pins 22, with the pins extending downwardly from the shoe underside. The outer periphery of rim 12 is provided with a first set of recesses 44, as may be done by milling. The recesses extend to the outer periphery of rim 12 and receive, as indicated at FIG. 8, the dowel pins 22. The dashed circle around support member 28 of FIG. 7 indicates an off-set mode for one direction of rotation. A second set of recesses 46, similar to the first set except for their angular location on the rim 12, receives the dowel pins 22 when the opposite off-set rotation mode is desired.

In the embodiments of FIGS. 1 and 3, it is necessary to axially move the thrust shoes in order to effect relocation, while in the embodiments of FIGS. 5 and 7 the thrust shoes may be pulled radially outwardly prior to repositioning.

Figure 9B:
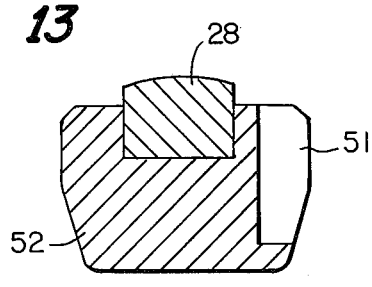
Figure 9A:
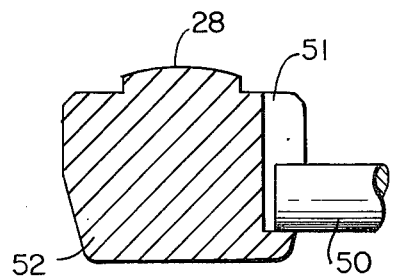
Figure 9C:
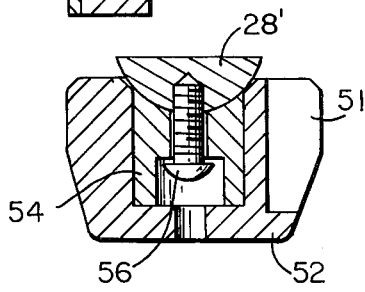
Figure 9D:
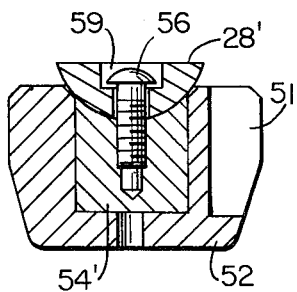

Referring now to FIGS. 9a–9e, several embodiments of the supporting abutment 28 are illustrated. Referring now to FIG. 9a, the numeral 28 denotes an integral, upper rounded portion formed from body 52, the latter including a slot 51. The unthreaded end 50 of a stud projecting radially inwardly from the outermost portion of base ring 10 maintains the abutment 28 in the angular positions indicated at FIGS. 1, 3, 5 and 7. At FIG. 9b, a variant is illustrated wherein the support member 28 is separate and is embedded in the top of body 52. At FIG. 9c, the rockable support 28' assumes the form of half a sphere. The numeral 54 denotes a supporting collar carried by body 52 while the numeral 56 denotes a threaded stud. As indicated in the drawing, there is an appreciable amount of play or clearance so that element 28' may rock slightly about the base member 52 to thereby allow the thrust shoe to rock and form a wedge-shaped lubricating film in cooperation with a thrust collar. FIG. 9d illustrates a similar embodiment wherein the support 28' is again in the form of half of a sphere, now provided with a recess 59 at the flat portion thereof for the reception of threaded fastener 56. The supporting member 54' is carried internally by member 52. Again, the clearance between the sides of the fastener 56 and the half sphere 28' is such as to permit slight rocking of the thrust shoe.

Figure 9E:
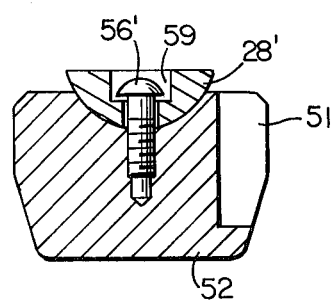

Referring now to FIG. 9e, the half spherical support member 28' is again provided with a recess 59 in the flat portion and a threaded stud 56' holds the member 28' to the base member 52. It will be seen that there is clearance between the aperture in the member 28' which receives the fastener 56' and the sides of the fastener. The remainder of the fastener is threaded into support 52. Again, this clearance allows for rocking for the formation of the wedge-shaped lubricating film.

Referring now to FIG. 10 of the drawings, an elevational view of a support arrangement is illustrated. The numeral 16 again represents a thrust shoe such as shown in FIGS. 1 and 2. The numeral 17 denotes a hardened insert placed in the bottom of shoe 16 and formed of a metal having a hardness greater than the shoe 16. Under certain conditions of loading and shoe body material, insert 17 may be omitted. The numeral 52 denotes one of a trio of leveling plate elements and corresponds to the base member 52 of FIGS. 9a–9e. Laterally extending ears are provided on the base 52 and these ears rest on complementary ears on remaining leveling plate elements 60 and 62. These latter two elements are positioned by means of dowel pins 64 and 66 on base ring 10. A thrust collar or runner 70 is illustrated as in engagement with thrust shoe 16 and shoe 32, the collar or runner being carried by the lower portion of a mass rotating about a vertical axis. The axis of rotation need not, however, be vertical. In such instances where the axis of rotation of the mass varies slightly, the leveling plate assembly 52-60-62 is able to rock or adjust itself by virtue of the indicated configuration to compensate for such changes. The leveling plates 60 and 62, positioned by dowel pins 64 and 66, are seen as rockable about downwardly extending protuberances through which the dowel pins upwardly extend.

Referring now to FIGS. 11—13, detailed views of a typical thrust shoe are illustrated. Referring now to FIGS. 11 and 13, it is seen that the hard metal insert 17 may be joined to the underside of the shoe 16 by staking, denoted generally by the numeral 17'. As seen best in FIG. 13, a radially inwardly extending ledge 19 is formed relative to the bottom of the shoe so that it may extend over the top of inner rim 14 of base ring 10. Such extension is indicated by the dashed lines overhanging portion 14 at, for example, FIG. 1 of the drawings.

In FIG. 12, a similar shoe is indicated, (shown also at FIG. 6) except that the radial sides are straddle milled so as to form parallel sides as opposed to angularly disposed sides in the embodiment of FIG. 11. Either type of shoe may be used in the practice of the invention.

What is claimed is:

1. A thrust bearing assembly including a base ring and a plurality of thrust shoes angularly positioned about and supported by the base ring, means to preclude angular displacement of the thrust shoes relative to the base ring for a given angular setting of the thrust shoes relative to the ring, the angular setting corresponding to a direction of rotation, an axially extending abutment carried by the base ring and upon which the thrust shoes rest in an offset manner, the improvement which comprises, for each thrust shoe,
   a. means for adjustably positioning the thrust shoe about the base ring, so that the thrust shoe can be adjusted clockwise and counter clockwise relative to its supporting abutment,
   b. whereby the same thrust shoe may be adjusted for offset support for both right and left rotation of a rotatable member.

2. The thrust bearing assembly of claim 1 wherein each thrust shoe is arcuate in form at least on its bearing surface.

3. The thrust bearing assembly of claim 2 wherein each thrust shoe is substantially planar on its abutment contacting surface.

4. The thrust bearing of claim 1 wherein said (a) means for angularly positioning each thrust shoe comprises dowel pin members extending into both the thrust shoe and the base ring, there being a second set of dowel pin receiving openings carried by either the base ring or the thrust shoe, said second set of openings being angularly located with respect to the dowel pins.

5. The thrust bearing of claim 1 wherein said (a) means for angularly positioning each thrust shoe comprises abutments carried by the base ring at the angular ends of each thrust shoe, said abutments being angularly adjustable with respect to the base ring.

6. The thrust bearing of claim 4 wherein said second set of openings is carried by said thrust shoe.

7. The thrust bearing of claim 4 wherein said second set of openings is carried by said base ring.

8. The thrust bearing of claim 4 wherein said second set of openings are recesses in the outer periphery of said base ring.

9. The thrust bearing assembly of claim 1 wherein said axially extending abutment includes a part-spherical element having a flattened surface adapted to contact a thrust shoe.

10. The thrust bearing assembly of claim 9 wherein said part-spherical abutment carries a threaded fastener, said abutment resting in a recess in a leveling plate assembly.

11. The thrust bearing assembly of claim 9 wherein said part-spherical element is secured to a base member by means of a fastener extending through an aperture in the former, said aperture fastened to the latter.

* * * * *